(12) United States Patent
Manber et al.

(10) Patent No.: US 7,599,911 B2
(45) Date of Patent: Oct. 6, 2009

(54) METHOD AND APPARATUS FOR SEARCH RANKING USING HUMAN INPUT AND AUTOMATED RANKING

(75) Inventors: Udi Manber, Palo Alto, CA (US); Chi-Chao Chang, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 10/213,353

(22) Filed: Aug. 5, 2002

(65) Prior Publication Data

US 2004/0024752 A1 Feb. 5, 2004

(51) Int. Cl.
*G06F 17/30* (2006.01)
(52) U.S. Cl. ............................ 707/3; 707/100; 707/101; 707/102
(58) Field of Classification Search ................. 707/3–5, 707/10, 104.1, 100–102; 705/26
See application file for complete search history.

(56) References Cited

U.S. PATENT DOCUMENTS

| | | | |
|---|---|---|---|
| 6,078,916 A | 6/2000 | Culliss | |
| 6,240,408 B1 | 5/2001 | Kaufman | |
| 6,311,194 B1 | 10/2001 | Sheth et al. | |
| 6,631,372 B1* | 10/2003 | Graham | 707/5 |
| 6,718,324 B2* | 4/2004 | Edlund et al. | 707/5 |
| 2002/0024532 A1* | 2/2002 | Fables et al. | 707/104.1 |
| 2002/0143759 A1* | 10/2002 | Yu | 707/5 |
| 2002/0169760 A1* | 11/2002 | Cheung et al. | 707/3 |

OTHER PUBLICATIONS

McIntosh, "Seeking search engine perfection", The Guardian, Jan. 17, 2002, 4 pages.

* cited by examiner

*Primary Examiner*—Sana Al-Hashemi
(74) *Attorney, Agent, or Firm*—Ostrow Kaufman & Frankl LLP; Seth H. Ostrow (57) ABSTRACT

A search system provides search results to searchers in response to search queries and the search results are ranked. The ranking is determined by an automated ranking process in combination with human editorial input. A search system might comprise a query server for receiving a current query, a corpus of documents to which the current query is applied, ranking data storage for storing information from an editorial session involving a human editor and a reviewed query at least similar to the current query, and a rank adjuster for generating a ranking of documents returned from the corpus responsive to the current query taking into account at least the information from the editorial session.

18 Claims, 4 Drawing Sheets

METHOD AND APPARATUS FOR SEARCH RANKING USING HUMAN INPUT AND AUTOMATED RANKING

FIELD OF THE INVENTION

The present invention relates to searching document sets in general and more particularly to presenting search results with rankings to further inform the searcher of the search results.

BACKGROUND OF THE INVENTION

Ranking is difficult to handle for large numbers of queries and/or large numbers of documents. For systems with only a few queries, preset results can be generated and for systems with only a few documents, the documents can often be ranked in a query-independent ranking, such as by date. However, for most practical systems with open-ended queries and large document sets, ranking must often be done at least in part on the fly, i.e., the ranking of a list of elements is determined and finalized only after the query that would return that list is received. This problem is particularly difficult where the document set searched is documents on the Web (i.e., the collection of documents stored on servers interconnected via the Internet and referred to as the "World Wide Web"), because by some estimates, there are several billion searchable documents on the Web and a typical search might yield thousands or hundreds of thousands of documents and a typical searcher can only deal with at most a few dozen relevant references.

If a specific Web address for a document is known, a user can supply the address (typically a URL, or Uniform Resource Locator) to a browser, which would then use its underlying protocols to quickly obtain that specific document. However, more and more typically, a user does not know exactly where the desired information is, and that is one task that ranking systems can help with. It should be understood that ranking systems do not require a network, but might be used on a single computer or computer system to rank information stored there.

Generally, network nodes on the Internet that connect to other network nodes support a variety of protocols as various network levels. At the application level, many Internet nodes support HyperText Transport Protocol (HTTP) for sending and receiving hypertext pages, which might include HyperText Markup Language (HTML) pages and other data supported by devices and software that handle HTTP messages. HTTP is a client-server protocol, in that a node that acts as an HTTP client makes requests of a node that acts as an HTTP server. When an HTTP client makes a request, the request includes a Universal Resource Locator (URL) that refers to the page or data requested. The URL comprises a globally unique domain name and possibly other fields that are specific to that domain name. Thus, any HTTP client can make a request by sending the request into the network. The network will resolve the domain name and route the request to an HTTP server at the specified domain and that HTTP server will resolve the remaining fields of the URL to determine what was requested.

This approach works well when the HTTP client has a URL for the desired data. However, where the client or the user operating the client does not have a specific URL in mind, searching is usually done to find the resource or resources of interest. Several approaches to searching have been tried and are currently in use. One approach is the directory approach, where large numbers of URLs and references to pages are stored in a hierarchical structure and are searchable or navigable via the structure. An example of this approach is the Yahoo! directory. With the Yahoo! directory, a Yahoo! user directs a browser to a search page and submits a search from that page. The search is applied to the Yahoo! hierarchical (taxonomical) structure and results are presented to the user. The results can also include hits from a search engine searching on the terms of the search.

Such approaches work well to find well-categorized information and information that is not voluminous, but problems occur when the search results can fall into many different topics and/or there are a large number of documents that match the search. With the growth in content volume available over the World Wide Web (the collection of documents accessible over the Internet or similar network using HTTP or the like often including hyperlinks from document to document, thus creating a "web" structure, referred to as "the Web" for brevity), a typical search might yield far more hits than can be processed by the searcher. As a result, the hits in those cases need to be ranked. Ranking allows for the more relevant pages to be presented higher in the ranking than other pages.

Search ranking systems using input from users of the system are known. For example, U.S. Pat. No. 6,078,916 shows a search system wherein the search activity of users is monitored and that activity is used in ranking results of later searches. Thus, the more often users click on one of the hits, the higher that hit is ranked in subsequent search results.

U.S. Pat. No. 6,240,408 shows another approach to search results ranking. In the system shown there, a query is applied to a controlled database containing selected data and an uncontrolled database containing possibly unselected and uncontrolled data. The ranking of results in the controlled database is used to inform the ranking process of ranking results of the query of the uncontrolled database.

Ranking by human editors reviewing search results provides more relevant ranking than automated processes and even search users, because human editors possess better intelligence than the best software and more clearly understand distinctions in pages, and human editors focus on areas of their expertise. For example, a human editor would more easily spot a page that is irrelevant but contains terms designed to get a high ranking from an automated process. However, human editors cannot process the volume of searches typically received by a search system and cannot keep up to date the queries they do process in view of the relevant pages that are added for consideration, modified or removed. In addition, in an open-ended query system, the number of possible queries can easily be in the millions. Even if editors concentrate only on the most common queries, the results change all the time as new data becomes available, old data becomes irrelevant, new meanings are created for old terms, or new events occur. If the results are based solely on what the human editors decided on one day, they might be stale and out of date the next day.

BRIEF SUMMARY OF THE INVENTION

In one embodiment, a search system returns search results ranked based on human editor input and automated results. The search system provides search results to searchers in response to search queries and the search results are ranked. The ranking is determined by an automated ranking process in combination with human editorial input. A search system might comprise a query server for receiving a current query, a corpus of documents to which the current query is applied, ranking data storage for storing information from an editorial session involving a human editor and a reviewed query at least related to the current query, and a rank adjuster for generating a ranking of documents returned from the corpus responsive to the current query taking into account at least the information from the editorial session.

The search system allows search results to be informative and up-to-date, even if a human editor does not revise the editorial results as new information becomes available. Other features and advantages of the invention will be apparent in view of the following detailed description and preferred embodiments.

DETAILED DESCRIPTION OF THE INVENTION

Embodiments of the invention will now be described, by way of example, not limitation. It is to be understood that the invention is of broad utility and may be used in many different contexts.

The example of a search process as described herein below can be modelled by a searcher presenting to a search system a query and receiving a response (search results) indicating the one or more "hits" found. A query can be in the form of key words (e.g., searching for the latest football scores with a query "football games scores recent"), structured query statements (SQL, Boolean expressions, regular expressions, etc.), by selecting terms from choice lists, following links or a number of other methods currently in use or obvious to one of skill in the art upon review of current literature and/or the present disclosure.

When a query is received by a search system, it processes the search and returns one or more "hits", where a "hit" is the atomic unit handled by the search system. For example, where the search system manages a structured database, the hits are records from the structured database. Where the search system manages documents, such as text documents, image and text documents, image documents, HTML documents, PDF documents, or the like, the atomic unit is the document. It should be understood that the present invention is not limited to any particular atomic unit, but by way of example, much of this disclosure describes searching using the document as the atomic unit. Furthermore, a structured database is not required.

A hit is an atomic unit that the search system identifies as matching criteria defined by the query. It should be understood that the search system need not provide all hits or only hits that match the query. For example, the search system might limit the number of hits returned to some number, might apply other limitations to the query term, such as omitting hits that match the query but are not cleared to be provided to the particular searcher, ignore duplicate hits, etc. The search system might also expand the search results to include hits that almost match the query, hits that are designated to be included in searches, such as special topic hits, advertising hits, etc. Some expansion or contraction might be dependent on the size or content of the search results prior to such expansion or contraction. For example, the search engine might add hits that are close if no hits would otherwise be returned and might remove hits if too many hits would have been returned, such as by deleting common words from queries prior to completing the search results.

A searcher can be a human user, such as a person typing in search terms into a browser window to query a search engine via the Web, but can also be an automated process, such as a computer program capable of sending queries to search engines in the form expected by the search engine. For example, a computer program might generate queries and form HTTP messages directed at a Web server coupled to a search engine.

Search results are one or more hits, where each hit might be returned as an entire document, as a reference to the document, as a summary of the document's contents, some combination thereof, or the like. Preferably, the search results are ranked in a manner apparent to the searcher. Ranking might be by order of appearance on a search results page, by numbering or lettering, by distinctive icons, or the like. If the search results include text, the ranking might be shown by differences in coloration, font, shading, formatting or the like. For automated processes, the rankings might be supplied in machine readable form not normally displayed to a human searcher, such as by XML metadata.

In many of the examples shown herein, the search engine searches among a set of documents for documents (hits) that match the criteria defined by the query. It should be understood that the term "document" is generally used to refer to units of the corpus being searched. A document can be a document, such as a contract, a file, a story, a writing, or the like, but might also be a snippet of text, data that might be considered part of a document in other contexts, program code, image data, a stored file, or the like. Therefore, the term need not be narrowly construed.

As described herein, a querying system accepts queries and returns ranked results, typically in real-time or near real-time. In ranking the results, the querying system obtains automated real-time search results that have a ranking, or at least a default order. Such automated results might be results from a Web search engine, database query, or the like.

The querying system also obtains editor inputs for the query (or a query that is judged similar enough to the posed query) that might include 1) a list of the results that the editor viewed at the time of evaluation of the query results, 2) the changes, in the ranking (promotions, demotions, deletions, insertions), 3) suggestion lists presented to the editor for use as insertions and/or other relevant or possibly relevant editor state and/or conditions. Editor state and/or conditions might include the background of the editor. Suggestion lists might include results from other search engines, important press releases or other operator key items. Thus, with suggestion lists, an editor can "merge" results from more than one search engine in a human-reviewed manner.

Promotions and demotions might be absolute ("Rank this document first highest."), relative to itself ("Rank this document four positions higher than it would otherwise be."), or relative to another document ("Rank this document higher than this other document."). Other types of promotion/demotion might include "remove this document from consideration no matter what the automatic system suggests", "this set of documents are to be given equal ("tied") rankings", "do not rank this document higher than position P" for some integer P, or the like.

A "blender" blends the automated search results with the editor inputs for one or more editors, such as by combining the ranked list saved by the editor at the time of evaluation of the query results and the ranked automated search results, to form a final ranked list of results. In this manner, the blender provides an up-to-date ranked list of hits, but preserves the judgments made by the editors. Using this system, a querier can ensure that the results are always fresh based on automated access to the entire corpus, while at the same time taking into account the intelligent decisions made by the editors and the context in which they were made.

The blending process allows for useful merging of automated search results and human editor input given the context of the hits. For example, if automated ranking software a certain document, A1, as the highest ranked document for a certain query, Q, but a human editor selects a different document, E1, then the response to the query at a later time might show A1 or E1 as the highest ranked document, depending on the context in which the editor made the decision, such as what documents were available to the editor when the decision was made. For example, if A1 was not available to the editor at the time of the editorial ranking, A1 is a new document, so it is the highest ranked document as it is more up-to-date, but if the editor had already seen A1 and decided that E1 was more relevant, then that decision overrides.

"Relevance" can depend on context. Typically, more relevant documents are documents more likely to be of interest to a person searching the document corpus. Under some constraints, relevance might be weighted by directions from the operator of the query server, corpus or other component, such as having relevance weighted by consideration from the author of the document or by external factors such as the source of the document. For example, if a searcher presents the query "car purchasing online" the ranking might rank higher the pages from a more highly regarded merchant than from an unreliable merchant. As another example, if the presented query is "political events 'New York City' recent", articles known to be published by the New York Times might be given greater relevance even than documents with nearly identical content.

Referring now to the figures, an exemplary querying system will now be described.

Figure 1:
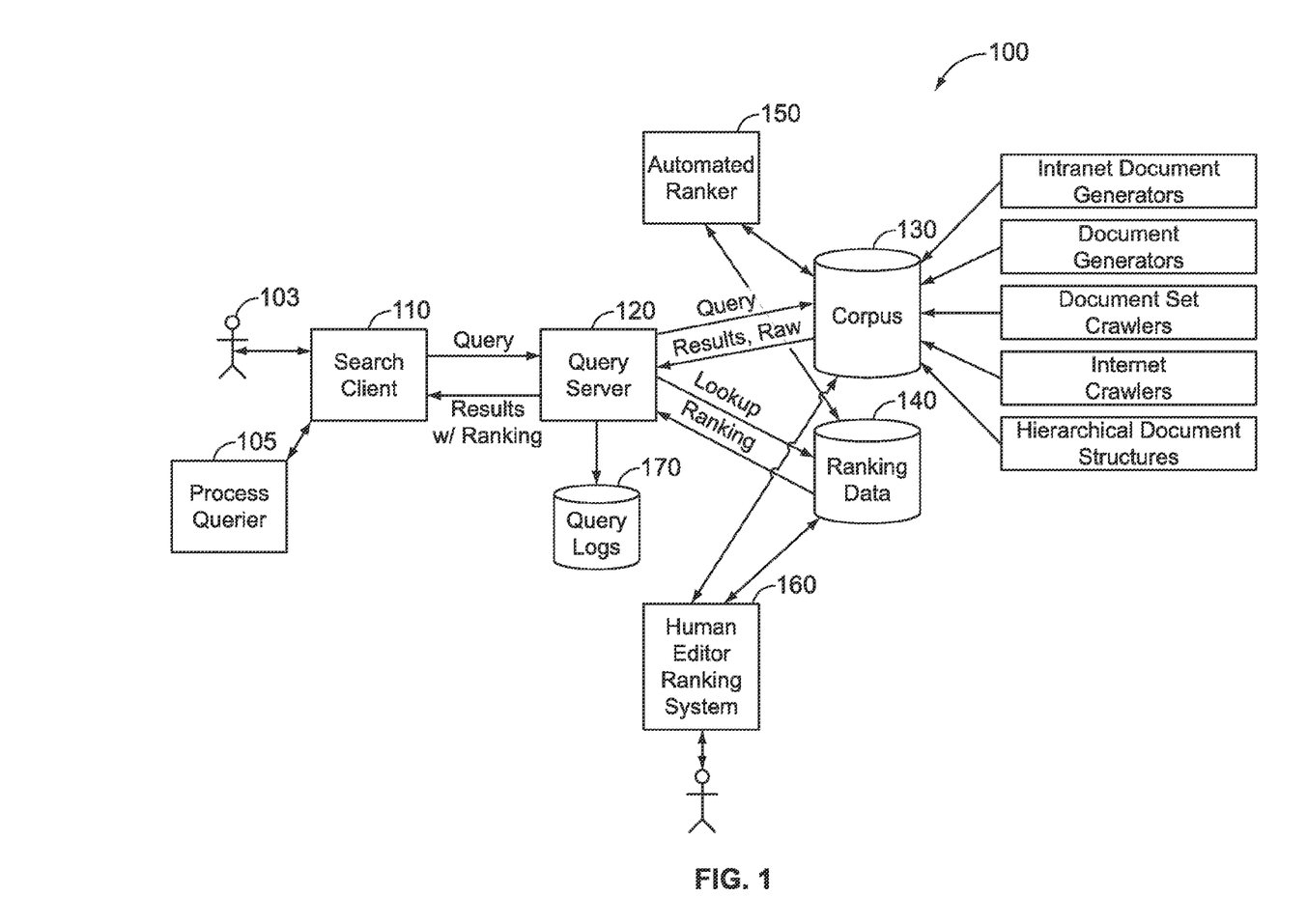
FIG. 1 is a block diagram of a querying system according to embodiments of the present invention.

FIG. 1 is a block diagram of a querying system 100 according to embodiments of the present invention. Using system 100, a querier, such as a human querier 103 or a computer process querier 105, applies a query to a search client 110, which in turn provides the query to a query server 120 and receives back a result set comprising "hits" ranked by a relevance. To generate the results of the query, query server 120 accesses a corpus 130 and a ranking database 140 and then provides the query, and possibly all or part of the results, to a query log 170.

Corpus 130 might be a database, but might also be a non-database structure. For example, corpus 130 might be a large XML document. Corpus 130 might include the documents themselves, or just references thereto. As explained herein, "document" is used generally herein to refer to data that is treated as a unit for querying purposes. For example, the corpus might be all of the articles written for a collection of publications and in that example a query might be "all of the articles including the words 'fashion design' in their titles" and the results are a listing of matching articles from the corpus. As shown, corpus 130 could be populated from document generators, such as an intranet document generator, another type of document generator, a document set crawler that crawls through a network space to generate a document set or a mapping to documents in the network space, an Internet crawler that crawls the Internet following hyperlinks to identify documents to be part of the corpus, a hierarchical document structure such as compendiums of XML structured documents, or other sources of documents or document references.

An automated ranker 150 generates ranking information for documents in corpus 130 or for queries from query server 120, without requiring human user intervention. In some embodiments, automated ranker 150 takes no action until a query is received and then ranks for that query, but in other embodiments, automated ranker 150 can at least preprocess documents in corpus 130 to come up with some useful ranking data that is independent of the queries received after any preprocessing steps. Ranking data is stored in ranking data storage 140, but in some embodiments, the ranking data generated by automated ranker 150 is provided to query server 120 as the ranking data is generated, which in turn might or might not be stored in storage 140 for subsequent queries.

As shown, a human editor ranking system 160 reads from corpus 130 and provides ranking data to be stored in ranking storage 140. As explained in more detail below, human editor ranking system 140 might include some automated processing steps interposed between decisions of the editors and the generation of ranking data, but essentially, there is a human component to the decisions. For example, the editor might consistently rank documents containing "tennis elbow" higher than documents containing "tennis racket" in relation to queries for "medical conditions related to sports" and the editor system might automatically lower the ranking of the "tennis racket" documents relative to the "tennis elbow" documents in relation to a query about "injuries", since the latter might be inferred as being more relevant to the query, based on the rankings provided by the human editor. In any case, the ultimate results are based on the editor's ranking.

An example of a flow through query system 100 will now be described. As an example, a human user enters a query for "medical conditions related to sports" into search client 110. While this example is a natural language query, the system is not so limited. Other types of searches might be keyword searches ("medical conditions injury sports"), proximity searches ("medical condition" within/5 sports within/5 injury"), Boolean searches ("'medical condition' AND sports AND NOT (infant OR genetic)"), segment searches ("title='sports' AND body='medical condition'"), SQL statements, multiple-choice selections, or the like.

The query is then presented to the query server, which uses it to retrieve results from corpus 130. In some embodiments, the query as entered by the user is passed to query server 120 unchanged and query server passes it to corpus 130 unchanged. For example, where corpus 130 is a document database with an SQL interface and queries are written by users using SQL, the query can be passed directly to corpus 130. In other embodiments, however, search client 110 might modify the query, such as by reformatting it or enveloping it, query server 120 might then modify it again to reformat it for a native processing instruction set usable with corpus 130 or to optimize the query or to evaluate the query such that query server 120 need only make requests for documents from corpus 130.

In any case, when query server 120 presents corpus 130 with a query or a request for documents, or the like, corpus 130 can provide results to query server 120, namely the documents ("hits") responsive to the request. In some embodiments, documents beyond a limited number or below a threshold are not provided, so that query server 120, query client 110 and other components are not unduly burdened with documents of lesser interest to the user.

Query server 120 also obtains ranking data for the documents retrieved. The ranking data can either be query specific ("For query Q, document A is more relevant than document B.") or query independent ("Document A is more relevant than document B."). This ranking data can then either be provided to search client 110 or can be used to order the hits on a results list provided to search client 110.

The ranking data in storage 140 that is provided to query server 120, as is explained below in more detail, is typically a combination of automated ranking data and human editorial input, with the human editor input being provided prior to the receipt of a particular query and the automated ranking data being provided in real time. In some cases, the corpus 130 does not exist ahead of time per se, but logically represents documents elsewhere and gathers its response in real time. For example, corpus 130 might represent all documents known to be present in the World Wide Web, but such documents, or lists of such documents are collected only after the query is received. It should be understood that the ranking of documents can be done in a similar fashion for different corpus embodiments.

Portions of present invention are described with reference to the Internet, a global internetwork of networks in common usage today for a variety of applications, but it should be understood that references to the Internet can be substituted with references to variations of the basic concept of the Internet (e.g., intranets, virtual private networks, enclosed TCP/IP networks, etc.) as well as other forms of networks. It should also be understood that the present invention might operate entirely within one computer or one collection of computers, thus obviating the need for a network.

Figure 2:
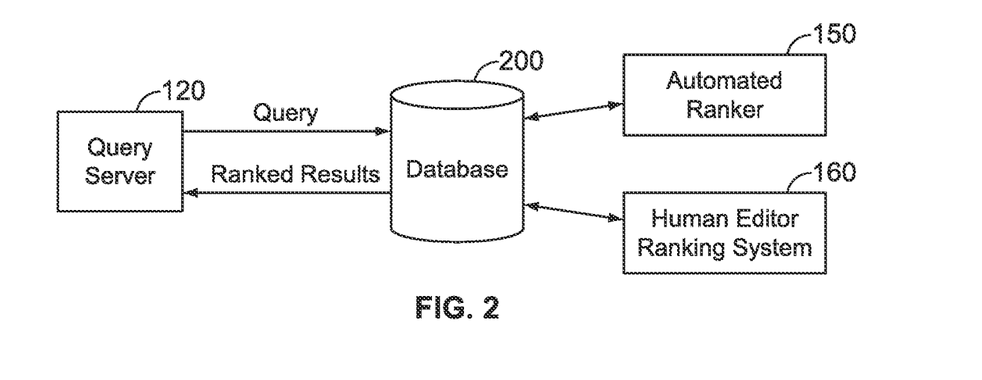
FIG. 2 is a block diagram of an alternative configuration of components of the querying system shown in FIG. 1.

While the embodiment in FIG. 1 depicts the corpus and ranking data as separate components, they might be integrated into a database 200 as illustrated in FIG. 2. In such an embodiment, the query server 120 presents queries to database 200 and receives responses therefrom, where the responses include the hits and ranking of the hits. Automated ranker 150 and human editor ranking system 160 interact with database 200 to provide ranking data.

Figure 3:
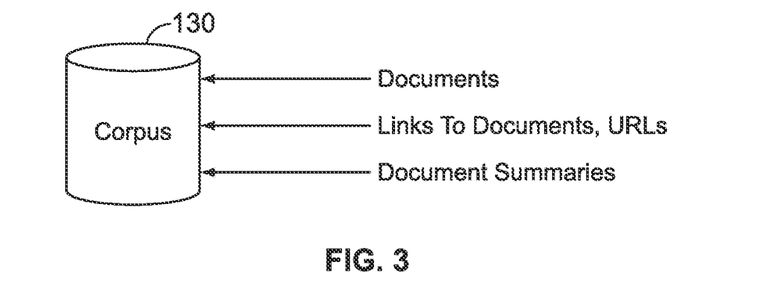
FIG. 3 illustrates possible inputs to a corpus searched in the querying system shown in FIG. 1.

As explained above and illustrated in FIG. 3, the corpus to which the queries are applied can be documents, links to documents (such as URLs), document summaries, or the like. But one example is the Yahoo! directory, which contains links to documents (such as home pages or other web pages) in the form of URLs and document summaries (such as short descriptions of the contents of documents or the relevance of the URLs). Another example is an Internet crawler, where the corpus is typically represented as an index of searched URLs. Of course, the search results of an Internet search can be provided by any automated crawler, searcher or indexer, or the like, such as the search results provided by AltaVista, AOL Search, Direct Hit, Excite, Google, HotBot, Inktomi, Lycos, MSN Internet Search, Netscape Search or WebCrawler.

Figure 4:
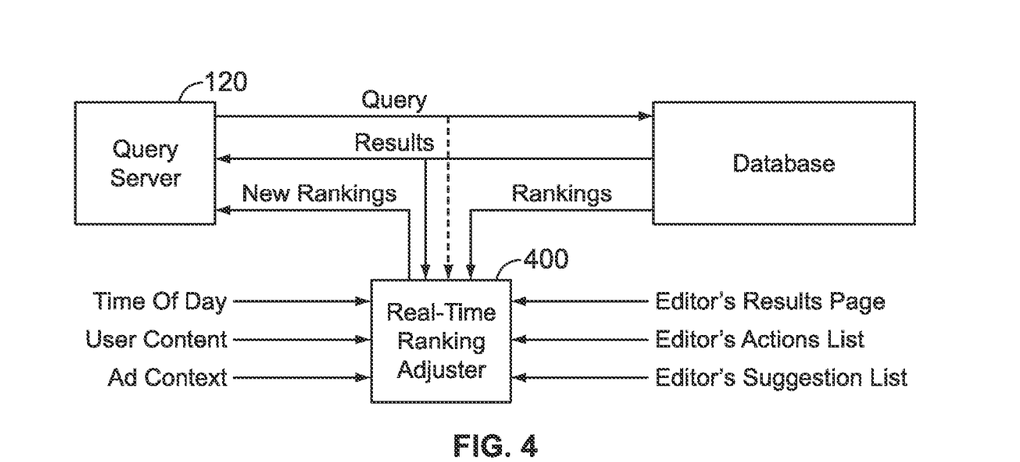
FIG. 4 is a more detailed block diagram showing interactions between a database having search results and rankings, a real-time ranking adjuster and a query server.

Referring now to FIG. 4, there is shown a variation of the system shown in part in FIG. 2 (and usable with components of system 100 shown in FIG. 1). In this variation, query server 200 presents a query to a database, which returns results (a list of hits), with ranking data stored in the database. The ranking data is provided to a real-time ranking adjuster 400, along with the results that are also provided to query server 200 in response to the query. The ranking data provided to adjuster 400 might, for example, be ranking determined by a search engine or other automated process either within the database or obtained from elsewhere and stored in the database.

Adjuster 400 operates on the data provided by the database, as well as other inputs, to produce an adjusted ranking that takes into account editor inputs. That adjusted ranking is provided to query server 120. Adjuster 400 can perform a number of analyses to adjust a ranking, such as the blending processes described below. Other inputs include an editor's results page, an editor's actions list, an editor's suggestion list, time of day, user context, ad context and the like.

An editor's results page might comprise a listing of search results presented to an editor at the time of an editor evaluation. This allows adjuster 400 to adjust the rankings based on what the editor saw at the time of an evaluation. For example, if an editor saw a document and did not adjust its ranking, adjuster 400 might try to have that document be in relatively the same ranking as it was in the editor's results page. However, if an editor saw the document and demoted it (reduced it in the rankings), adjuster 400 might also demote the document. Adjuster 400 has enough information to do this, because adjuster 400 is provided with the editor's action list, which might include actions on the editor's results page such as promoting a document, demoting a document, removing a document, adding a document, etc.

Adding a document might have been done by the editor selecting a document from a suggested document list and "adding" it to the editor's results page with some relative ranking. Adjuster 400 can also take into account what documents the editor considered for possible addition at the time of evaluation, since it is provided with the editor's suggestion list. For example, where a document appears on the editor's suggestion list and an editor's action indicates that a given document was added from the suggestion list into the results page with the second highest ranking and the adjuster notes that the document appears somewhere in the results provided by the database, the adjuster can promote that given page as needed so that it ranks second highest. On the other hand, if the adjuster notes that the editor's results page does not include a document and that document was on the editor's suggestion page, but the document then shows up in the results provided by the database, the adjuster can demote the document accordingly, including removing it from the results or demoting it sufficiently so that it is not presented to the user.

As explained above, ranking might be tuned with a threshold, so that documents ranked below the threshold are dropped from the results somewhere along the way to the user or moved to a page that is not presented to the user unless the user requests lower ranked documents.

Preferably, adjuster 400 is provided with the query that initiated the results being ranked, but adjuster 400 might instead perform ranking by analyzing the results, in effect inferring the query from the results. If adjuster 400 is provided with time of day inputs, it might change the rankings accordingly. For example, in a search for documents relating to restaurants, such as restaurant home pages, documents for restaurants that do not serve breakfast might be demoted if the search is performed early in the day.

Adjuster 400 can also take into account user context, such as the user's specified geographic location, such as by reordering a ranking to promote documents associated with geographic locations nearest the user's specified geographic location or reordering a ranking based on the particular user's previous activities, user preferences or profile. Yet other contexts that might be used are previous query words issued by that user or other users, click streams on search results by that user or other users, personalized/customized search settings or the user for other purposes or for this purpose.

Preferably, the user is informed of the inputs to the adjuster, such as an indication that the rankings were modified according to user context. In some embodiments, the user might be provided with an interface to adjust, add, modify or delete user context to provide a more relevant ranking. For example, where the user is identified as being from Sunnyvale, Calif. but is searching for clubs in Manhattan for a trip, the user might change his or her geographical user context so that adjuster 400 ranks clubs in New York more highly than clubs in California.

Other considerations taken into account by adjuster 400 might be internal considerations that do not require inputs other than what is already supplied. For example, adjuster 400 might rank pages based on a relevance measure of the resulting hits. Thus, pages that are deemed poorly written, or contain malicious or undesired code or content, could be demoted, while pages that other pages frequently link to might be promoted.

Once all the various inputs are taken into account, adjuster 400 provides rankings to query server 120. The rankings can be provided as a value associated with each of the hits on the results list, or merely an indication of how the lists should be ordered on presentation to the user. If there is a threshold, such as a limit on the number of hits or the minimum allowed ranking value, adjuster 400 could so indicate so that query server 120 can limit its response, or query server 120 could provide this step internally.

Figure 5:
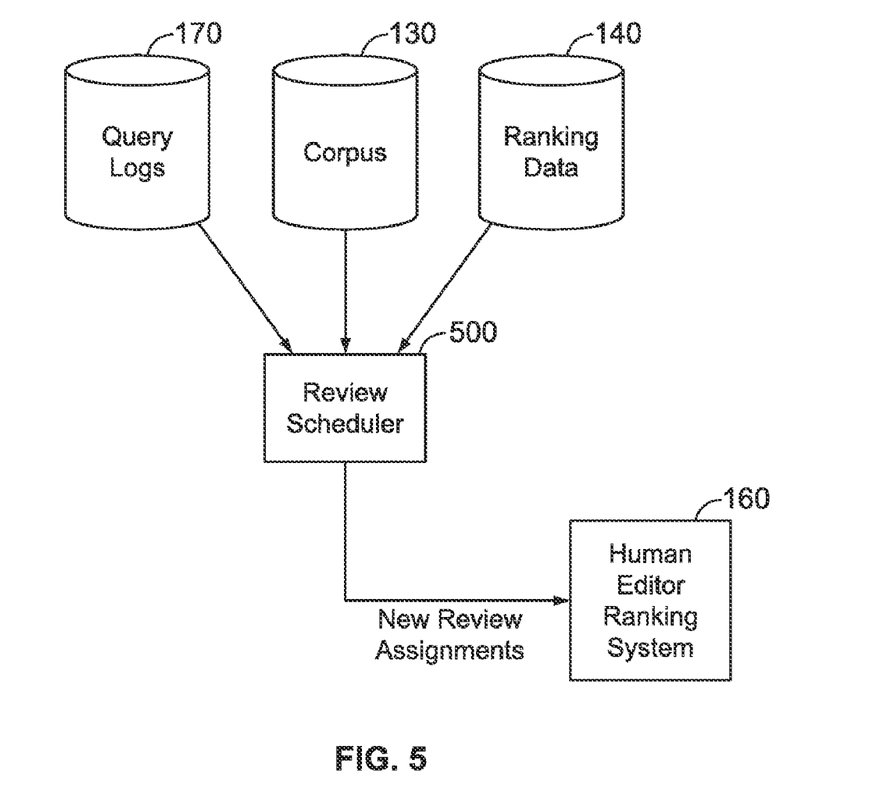
FIG. 5 is a block diagram of a review scheduler and its interaction with some of the elements shown in FIG. 1.

FIG. 5 is a block diagram of a review scheduler 500 and its interaction with some of the elements shown in system 100 shown in FIG. 1. As illustrated in FIG. 5, review scheduler 500 receives data (or otherwise obtains data, such as by a stream, polling, request/response, or the like) from query logs 170, corpus 130, ranking data storage 140 and issues new review assignments to human editor ranking system 160.

In an example of an operation, review scheduler 500 might periodically scan query logs 170 and pick up on frequent queries, then review corpus 130 and ranking data for relevant documents to determine whether new editorial input is needed. For example, if the query logs are showing increasing activity relating to topics (such as current events) that were not previously ranked by an editor or not recently ranked by an editor, that query might be scheduled for editorial input. Where a query was previously ranked by an editor, review scheduler 500 might consider the differences between the current results of a search of corpus 130 for the query and the corresponding editor's results page (from storage 140) that was presented to the editor at the time of the last editorial review (or the last several editorial reviews). If they are substantially the same, indicating that no significant changes occurred in the corpus relating to that query between the time of the editorial review and the present inquiry, review scheduler 500 would not schedule a review. However, if there a query for which there is little match between a current results list and the most recent editor's results page and the query is frequently showing up in the query logs, review scheduler 500 would schedule that query for review.

In assessing queries, nonidentical queries can be grouped. For example, a query for "fast racing cars" and "racing cars" might be considered the same query for ranking purposes. The results might or might not be the same, depending on what is returned from the corpus, but in each case the human input is the same. In other words, where an editor has reviewed search results for the query "racing cars" and provided editorial input (such as in the form of editor actions in view of an editor's results page and an editor's suggestions page), that input could be used in a nonidentical search.

Thus, when a user searches for "fast racing cars", assuming that there is editorial input for a "racing cars" query, but not for a "fast racing cars" query, the approximate equivalence of the queries is noted and an adjuster uses an automated ranker's results for the "fast racing cars" query and adjusts the rankings using the human editor's inputs for the "racing cars" query. Alternatively, once the approximate equivalence of the queries is noted, the automated ranker might use the "racing cars" query instead and the adjustment would occur with those two inputs. Other, well-known automatic approaches to generating equivalence classes for queries might be used, such as by textual relation, by semantic relation, by user context relation (i.e., knowledge that when any user searches for "A" often also searches for "B", and/or by results relation (intersection of results). In addition to automatically grouping different queries together for "equivalence", manual methods of specifying when queries are to be grouped might also be used.

While review scheduler 500 is described as scheduling based on selected inputs, other inputs might be provided and review scheduler 500 might schedule review assignments without any inputs, such as scheduling a review for a particular set of queries on a regular periodic basis. Human editor ranking system 160 can use those review assignments as the basis for what is shown to an editor and/or use other rules and methods for determining what gets reviewed and when. For example, editors themselves might decide which queries to review.

In some embodiments, a set of "important queries" is maintained and that is the set of queries that are scheduled for editorial review. In some embodiments, human editor ranking system 160 uses specialist editors wherein particular review assignments are routed to editors based on content, which can be the content of the query, results, prior ranking data, or some combination thereof.

Figure 6:
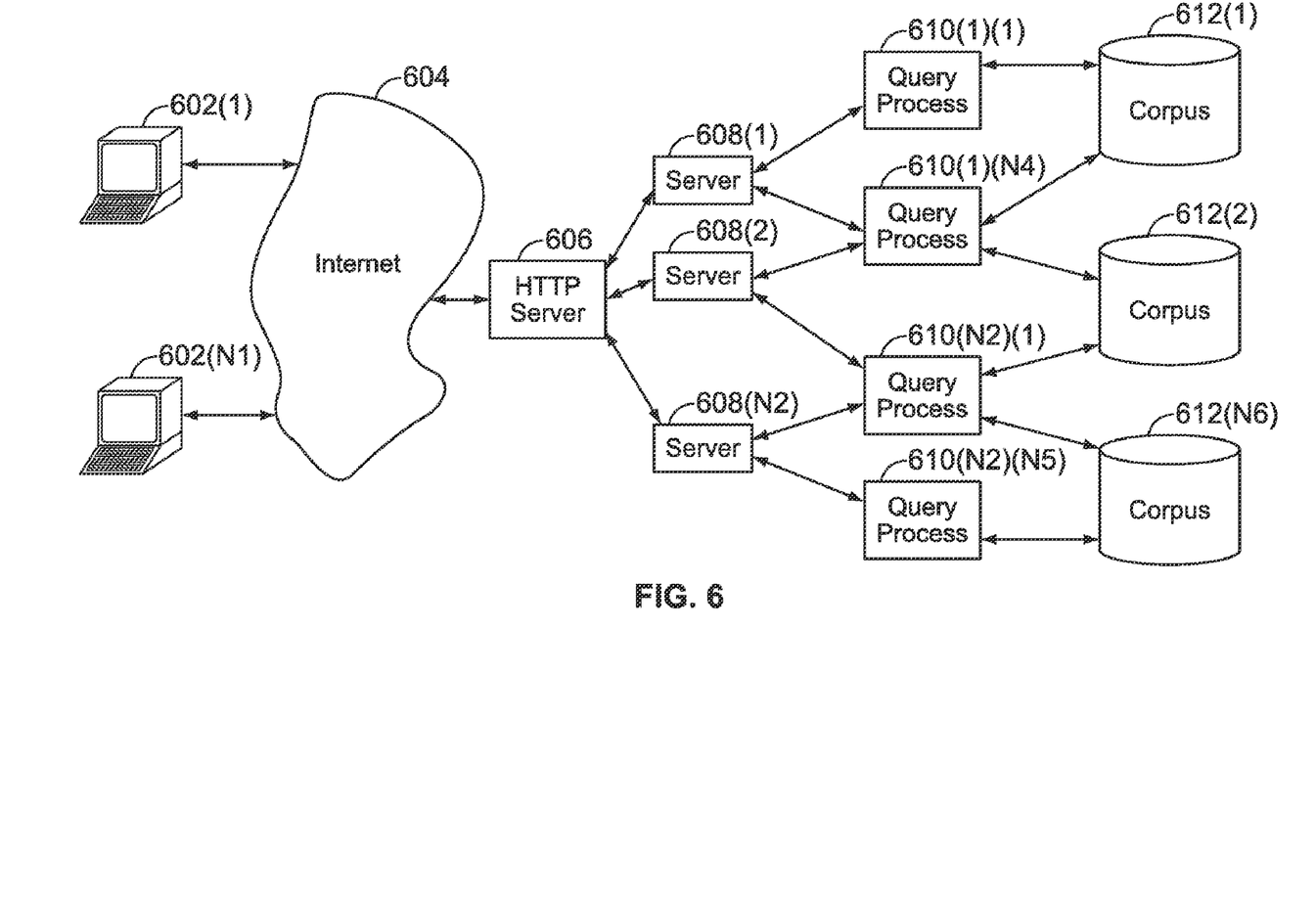
FIG. 6 is a block diagram of a networked system wherein a plurality of search clients can access a search system to apply queries to a corpus of documents.

FIG. 6 shows a networked system in which a plurality of search clients can access a search system to apply queries to a corpus of documents. In this system, one or more (but possibly thousands or more) client systems 602 make requests via the Internet 604. The requests flow to servers 608 via an HTTP server 606, but it should be understood that multiple HTTP servers might be present and other protocols might be used instead of, or in addition to HTTP. A server 608 sends the query to a query process 610, which might be an instantiation of a software object in server 608 or elsewhere, or might include hardware components. The query processes 610 then obtain documents, references to documents, links, or other indications of hits, from one or more corpuses 612.

In some embodiments, corpuses 612 are complete copies of the entire corpus, but in other embodiments, the corpuses 612 are subsets of the complete corpus. In the latter case, server 608 or server process 610 can determine, from the query and possibly other information, which corpus to use. Note that in some cases, one query process 610 might access more than one corpus 612, even for a single query.

In FIG. 6, multiple instances of objects are differentiated by a parenthetical index, such as 602(1) for a specific instance of a client system 602. For various objects, the terminal index is some unspecified number, such as "602(N1)". Where the number of objects is not required to be the same, the terminal indices are indicated with distinct variables. Thus, while exactly three servers 680 and three corpuses 612 are shown in FIG. 6, there are N2 (an indeterminate number) servers and N6 (another indeterminate number) corpuses 612 implied by FIG. 6, so a one-to-one correspondence of servers to corpuses is not required. Unless otherwise specified, different terminal indices can have the same or different values ranging from one to numbers larger than one.

Real-Time Ranking Example

The following example illustrates a process for adjusting a ranking in real-time, as might be done by real-time ranking adjuster 400 shown in FIG. 4. While one of the inputs to the adjuster is a default ranking provided by the database, such default ranking is not required, or might be replaced with an arbitrary ordering of elements. In this example, however, an existing ranking is assumed and the function used to adjust the ranking is referred to as "blend" representing that it "blends" the results from an editor's review and from an automated system response.

As used below, "provider" refers to a database, search engine, etc., that returns a list of elements in response to a query. The inputs to the adjuster are as shown in the command line:

blend.p1 –p0 (1,2,3, . . . ) –r (1,2,3, . . . ) –p1 (1,2,3, . . . )

wherein p0 is the provider's list last seen by editors, r is editor's recommendation, after seeing p0 (the "viewed set") and p1 is current provider's list. The adjuster's output is a list of elements, in ranked order. In this example, the adjuster is implemented as a PERL function "blend.p1". In these examples, lists can be ordered sequences of "sites" separated by commas, with each site represented by any symbol (digits, characters, strings, etc., for convenience purposes). The order defines the ranking, not the symbol. For example, (5,4,3,2,1) is a list of sites where site "5" is ranked highest (#1), "4" is ranked second highest (#2), etc.

The overview of the process performed by the adjuster will now be described. If there is a substantial difference between p1 and p0, the adjuster maintains the order of r in the output and inserts "new" entries of p1 into the output; otherwise, it blends r with p1 to obtain the output, taking into account p0 and other history.

Determining a "new" entry in p1 is not necessarily straightforward. Roughly speaking, it is a site in the latest provider's list that the editor was unaware of. Thus, it is important to consider what the editors have seen and for editors to denote what they have seen and/or considered in the editor's tool. The process might be performed differently depending on the case, as the examples below show.

Case 1: New Kids in the Block

First consider a p0 that is close to p1, who has a new site N:

blend.p1 –p0 "(1,2,3,4,5)" –r "(2,3,5,4,1)" –p1 "(1,2,N,3, 4)" 2 3 5 N 4 1 blend.p1 –p0 "(1,2,3,4,5)" –r "(2,3,5,4,1)" –p1 "(N,2,5,3, 4)" N 2 3 5 4 1

Note that N is inserted into r in both cases. N is ranked #1 in the final list because it beat most of the editors' recommendations.

Now, consider p0 distant from p1:

blend.p1 –p0 "(1,2,3,4,5)" –r "(5,4,3,2,1)" –p1 "(5,4,N,3, 2)" 5 4 N 3 2 1 blend.p1 –p0 "(1,2,3,4,5)" –r "(3,1,5,4,2)" –p1 "(N,5,4,3, 1)" N 3 5 1 4 2

Notice that both r and p1 are blended to form the two outputs. Now, adding a new kid A into editor's recommendation:

blend.p1 –p0 "(1,2,3,4,5)" –r "(A,1,5,4,2)" –p1 "(N,5,4,3, 2)" A N 1 5 4 2

Element "3" is left out of the final blend because it was deliberately removed by the editors.

Case 2: Lots of New Kids in the Block

The next two cases have several new sites in r and p1, who are naturally very distant from each other:

blend.p1 –p0 "(1,2,3,4,5)" –r "(3,1,5,A,B)" –p1 "(N,M,3, O,P,1,2,4,5)" N M 3 O P 1 5 A B blend.p1 –p0 "(1,2,3,4,5)" –r "(3,5,A,B,C,D)" –p1 "(5,X, 4,Y,1,Z,2)" 3 5 X A Y B C Z D Note the blending and that the unrecommended sites seen by the editors are left out (2 and 4 in the first, and 1, 2 and 4 in the second). What follows is a case where p0 and p1 are not so distant:

blend.p1 –p0 "(1,2,3,4,5)" –r "(3,5,A,B,C,D)" –p1 "(1,2, 3,4,5,X,Y)" 3 5 A B C X D Y Here, X and Y are simply inserted into the editors' recommended list. Now, consider demotions. Assume that editors decided to demote N and O:

blend.p1 –p0 "(1,2,3,4,5)" –r "(3,5,A,1,B)" –p1 "(1,N,2, M,O)" –x "(N,O)" 3 5 1 A M B We blend r with p1 but leave out N, O, and 2. This could also apply to suggestions that have been seen by editors but deliberately not added to the recommended list.

Case 3: Extremes

Consider the extremes:

blend.p1 –p0 "(1,2,3,4,5)" –r "(1,2,3,4,5)" –p1 "(A,B,C, D,E)" 1 A B 2 C 3 D 4 E 5 blend.p1 –p0 "(1,2,3,4,5)" –r "(1,2,3,4,5)" –p1 "(A,B,C, D,E)" –x "(A,B,C,D,E)" 1 2 3 4 5 blend.p1 –p0 "(1,2,3,4,5)" –r "(A,B,C,D,E)" –p1 "(1,2,3, 4,5)" A B C D E

Case 4: Old Kids in the Block

Where p1 is a permutation of r, the output is the editors' list itself:

blend.p1 –p0 "(1,2,3,4,5)" –r "(2,3,5,4,1)" –p1 "(1,5,3,2, 4)" 2 3 5 4 1 blend.p1 –p0 "(1,2,3,4,5)" –r "(2,3,5,4,1)" –p1 "(1,3,5,2, 4)" 2 3 5 4 1

Distance Functions

The distance function used in examples above can be a sum over all elements of the absolute difference between the rank of an element according to the two lists:

d(p0, p1)=sum of abs(p0(i)–p1(i)) over all elements i in S, where S=elements of p0=elements of p1

In that expression, the term d is normalized by its maximum value, ($\frac{1}{2}$) $|S|^2$. Some adaptation might be required for the case where sizeof(p0) !=sizeof(p1) and S=p0 U p1.

Another function could be used that counts the number of pairwise disagreements between two lists:

d(p0, p1)=|{(i,j) in S: i!=j, p0(i)<p0(j) but p1(i)>p1(j)}|

In that expression, d is normalized by ($\frac{1}{2}$) $|S|*(|S|-1)$.

No fixed threshold is needed to determine whether two lists are too far apart. Instead, the threshold can be a function of the size of S.

Core Blending Process

The core blending process blends N lists into one list, where N is two or more. The ranking of each element in the final list is a function of the ranking of that element in the input lists. In the above example, N=2 and the pair of lists being blended are r and p1. By way of example to explain a core blending process, assume the lists to be blended are:

(5,4,3,2,1) and (5,4,N,3,2).

We construct a directed graph (not acyclic) where each node is a element in either list and there is an edge between nodes A and B if B is ranked higher or equal to A in any list. For example, the nodes are 1,2,3,4,5,N and the edges are: 4->5, 3->4, 3->5, 2->3, 2->4, 2->5, 1->2, 1->3, 1->4, 1->5, N->5, N->4, 3->N, 2->N, 5->5, 4->4, 3->3, 2->2, 1->1, N->N. Notice that there is an edge from any node to itself.

Note that higher ranked elements in the final list have nodes with more incoming edges and fewer outgoing edges than those of lower ranked elements. To obtain this ordering, we can use Markov Chains (MC), a well-known technique in mathematics. An MC process is based on the following question (in the context of our graph): What is the probability of going from node A to B given an edge A->B? Given an initial probability distribution over the nodes (i.e., of being equally likely to start on any node), an MC method will give the final probability distribution after taking a random walk in the graph. In other words, assume as one starts on one node and flips a coin to decide which node to go next. After doing this many times, determine the probability of ending up in a given node.

The graph is represented as a transition matrix:

$$M = \begin{matrix} 0.200 & 0.200 & 0.200 & 0.200 & 0.200 & 0.000 \\ 0.000 & 0.200 & 0.200 & 0.200 & 0.200 & 0.200 \\ 0.000 & 0.000 & 0.250 & 0.250 & 0.250 & 0.250 \\ 0.000 & 0.000 & 0.000 & 0.500 & 0.500 & 0.000 \\ 0.000 & 0.000 & 0.000 & 0.000 & 1.000 & 0.000 \\ 0.000 & 0.000 & 0.000 & 0.333 & 0.333 & 0.333 \end{matrix}$$

keys =
1 2 3 4 5 N

By multiplying an initial state vector with the matrix M "enough" times (which simulates a random walk), the final state vector is:

x=0.001 0.005 0.017 0.152 0.780 0.044

The ordering of this vector is precisely the ordering of the blended list: 5 4 N 3 2 1.

This process is not only useful for blending two lists, but also for inserting certain elements of one list into another. The relative ranking of these elements in the blended list is used to determine where they should be inserted, as illustrated by the following example:

blend.p1 –p0 "(1,2,3,4,5)" –r "(3,5,A,B,C)" –p1 "(1,2,X, 4,T)" –g
. . .
ORDER=3 1 2 5 X A 4 B T C
STRENGTH=0.405 0.405 0.071 0.071 0.018 0.018 0.005 0.005 0.001 0.001

The blended order suggests a position for the new elements X and T relative to their corresponding nearest neighbors: X should be between 5 and A, and T should be between B and C. To break ties, the process considers the difference between the values: it is clear that X should follow 5 rather than precede A, since the difference between 5 and X is 0.053 whereas the difference between X and A is less than 0.001. As such, the process returns spits out rules are used as guidelines for inserting X and T into the editor's recommendation list, as follows:

RULES:
. . .
X FOLLOWS 5
T FOLLOWS B
. . .
SUGG ORDER=3 5 X A B T C

The invention has now been described with reference to the preferred embodiments. Alternatives and substitutions will now be apparent to persons of skill in the art. Accordingly, it is not intended to limit the invention except as provided by the appended claims.

What is claimed is:

1. A search system, wherein search results are provided to user search client in response to search queries, comprising:
 a query server for receiving a current query from one of a user search client;
 a corpus of documents to which the current query is applied;
 a review scheduler for generating a reviewed query and transmitting a review assignment based on the reviewed query to a human editor;
 a human editor ranking system for presenting review assignments to a plurality of human editors during an editorial session;
 ranking data storage for storing information from the editorial session involving a human editor including at least one ranking adjustment performed by the human editor and including at least one representation of a reviewed query at least similar to the current query, wherein the at least one ranking adjustment is an editorial adjustment corresponding to search results resulting from a search using the reviewed query; and
 a rank adjuster for generating a ranking of documents returned from the corpus responsive to the current query from the one of the user search clients taking into account at least the information from the editorial session by the human editor, wherein ranking of documents is based on rankings stored in the ranking data storage specific to at least one of the current query and the reviewed query.

2. The search system of claim 1, wherein the corpus of documents are documents available on the World Wide Web.

3. The search system of claim 1, wherein the corpus of documents are Web pages.

4. The search system of claim 1, wherein the information from an editorial session comprises one or more of indications of documents presented to the human editor, indications of ranking changes applied by the human editor during the editorial session and indications of documents from a suggestion list presented to the human editor.

5. The search system of claim 4, wherein the indications of ranking changes applied by the human editor during the editorial session include one or more of promotions, relative promotions, demotions, relative demotions, insertions and deletions.

6. The search system of claim 1, wherein the rank adjuster also takes into account one or more of user context, advertising context and time of day.

7. The search system of claim 1, wherein ranking of the search results is perceptible by an ordering of the documents, or representations of documents, returned from the corpus.

8. A method of generating search results in response to a search query, wherein search results comprise at least a listing of items from a corpus that are responsive to the search query and an indication, for at least some of the items, a ranking among the items, the method comprising:
 receiving a current query from at least one search;
 applying the current query to the corpus upon receiving the current query;
 obtaining search results responsive to the current query;
 obtaining an automated ranking of items in the search results;
 generating a reviewed query and transmitting a review assignment based on the reviewed query to a human editor;

obtaining human editorial ranking of items from stored editorial data for an editor context related to a reviewed query generated by a review scheduler, the reviewed query being at least related to the current query, wherein the stored editorial data represents ranking decisions made by human editor in one or more editorial sessions in a humand editor ranking system;

adjusting the automated ranking of items in the search results based on the human-editorial ranking to form an adjusted ranking of items in the search results; and providing the adjusted ranking of items in response to the current query from the at least one searcher.

9. The method of claim 8, wherein the step of responding occurs soon enough after the receiving step to be perceived as happening in substantially real-time.

10. The method of claim 8, wherein the reviewed query and current query are identical.

11. The method of claim 8, wherein the reviewed query and current query are similar.

12. The method of claim 8, wherein the corpus comprises Web pages.

13. The method of claim 8, wherein the step of adjusting comprises inserting items in the search results other than those returned in response to querying the corpus.

14. The method of claim 8, wherein the step of adjusting comprises deleting items from the search results returned in response to querying the corpus.

15. The method of claim 8, wherein the step of adjusting comprises reordering items in the search results returned in response to querying the corpus.

16. The method of claim 8, wherein the editorial data comprises one or more of indications of documents presented to the human editor, indications of ranking changes applied by the human editor during the editorial session and indications of documents from a suggestion list presented to the human editor.

17. The method of claim 16, wherein the indications of ranking changes applied by the human editor during the editorial session include one or more of promotions, relative promotions, demotions, relative demotions, insertions and deletions.

18. The method of claim 8, wherein the step of adjusting takes into account one or more of user context, advertising context and time of day.

* * * * *

UNITED STATES PATENT AND TRADEMARK OFFICE
CERTIFICATE OF CORRECTION

PATENT NO. : 7,599,911 B2 Page 1 of 1
APPLICATION NO. : 10/213353
DATED : October 6, 2009
INVENTOR(S) : Manber et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 276 days.

Signed and Sealed this

Twenty-eighth Day of September, 2010

David J. Kappos
*Director of the United States Patent and Trademark Office*